United States Patent
Nishijima et al.

(10) Patent No.: US 9,245,544 B1
(45) Date of Patent: Jan. 26, 2016

(54) SURFACE FORMING METHOD FOR ELECTRONIC COMPONENT

(71) Applicant: SAE Magnetics (H.K.) Ltd., Hong Kong (CN)

(72) Inventors: Natsuo Nishijima, Hong Kong (CN); Jian Hui Huang, GuangDong (CN); Hong Tao Ma, GuangDong (CN); Huan Chao Liang, GuangDong (CN)

(73) Assignee: SAE MAGNETICS (H.K.) LTD., Hong Kong (CN)

(*) Notice: Subject to any disclaimer, the term of this patent is extended or adjusted under 35 U.S.C. 154(b) by 0 days.

(21) Appl. No.: 14/341,048

(22) Filed: Jul. 25, 2014

(51) Int. Cl.
  *C25F 3/02* (2006.01)
  *G11B 5/127* (2006.01)
  *G11B 13/04* (2006.01)

(52) U.S. Cl.
  CPC ............. *G11B 5/127* (2013.01); *G11B 13/045* (2013.01)

(58) Field of Classification Search
  CPC .......... G11B 2005/021; G11B 5/1272; H01L 21/02381; H01L 21/02675; G02B 6/136
  USPC ............ 216/14, 24, 11; 430/21, 296; 438/691
  See application file for complete search history.

(56) References Cited

U.S. PATENT DOCUMENTS

| | | | |
|---|---|---|---|
| 5,230,990 A * | 7/1993 | Iwasaki et al. | 430/321 |
| 8,236,481 B2 * | 8/2012 | Nottola et al. | 430/321 |
| 2014/0131309 A1 | 5/2014 | Nishijima et al. | |

FOREIGN PATENT DOCUMENTS

| | | |
|---|---|---|
| CN | 101798729 | 8/2010 |
| JP | 2005-272901 | 10/2005 |

* cited by examiner

*Primary Examiner* — Duy Deo
*Assistant Examiner* — Maki Angadi
(74) *Attorney, Agent, or Firm* — Nixon & Vanderhye, P.C.

(57) ABSTRACT

A surface forming method for electronic component includes: forming a body that has at least one waveguide, with two ends of the waveguide exposed on a front end surface and a back end surface of the body; forming a photoresist film to cover on the front end surface of the body; irradiating a light from the back end surface of the body to remove a part, of the photoresist film, that covers at least a part of an end surface of the waveguide, thereby forming an exposed area on the end surface of the waveguide; etching the exposed area of the waveguide to form a recess; and removing the photoresist film. The position and size of the pattern could be controlled accurately and efficiently, instead of inefficient complex procedures of alignment.

11 Claims, 12 Drawing Sheets

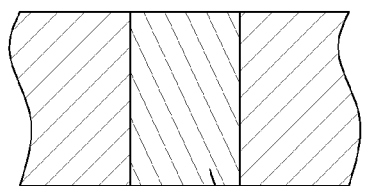
Fig. 8a  34
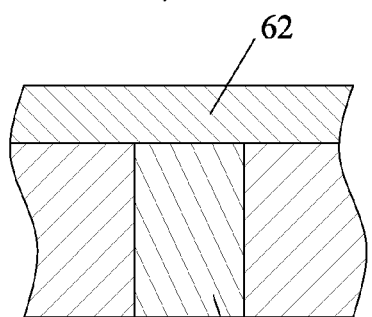
Fig. 8b  34
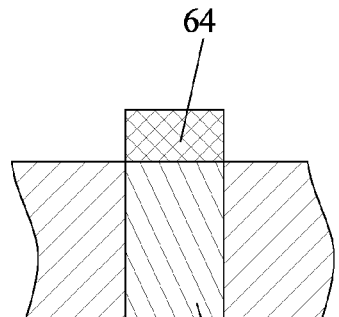
Fig. 8e  34
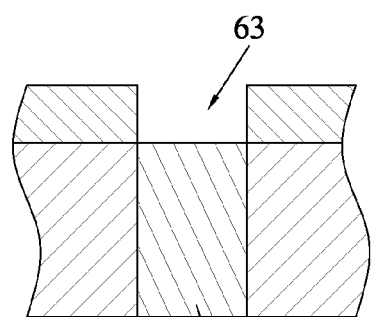
Fig. 8c  34
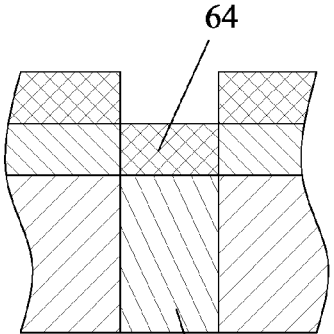
34  Fig. 8d

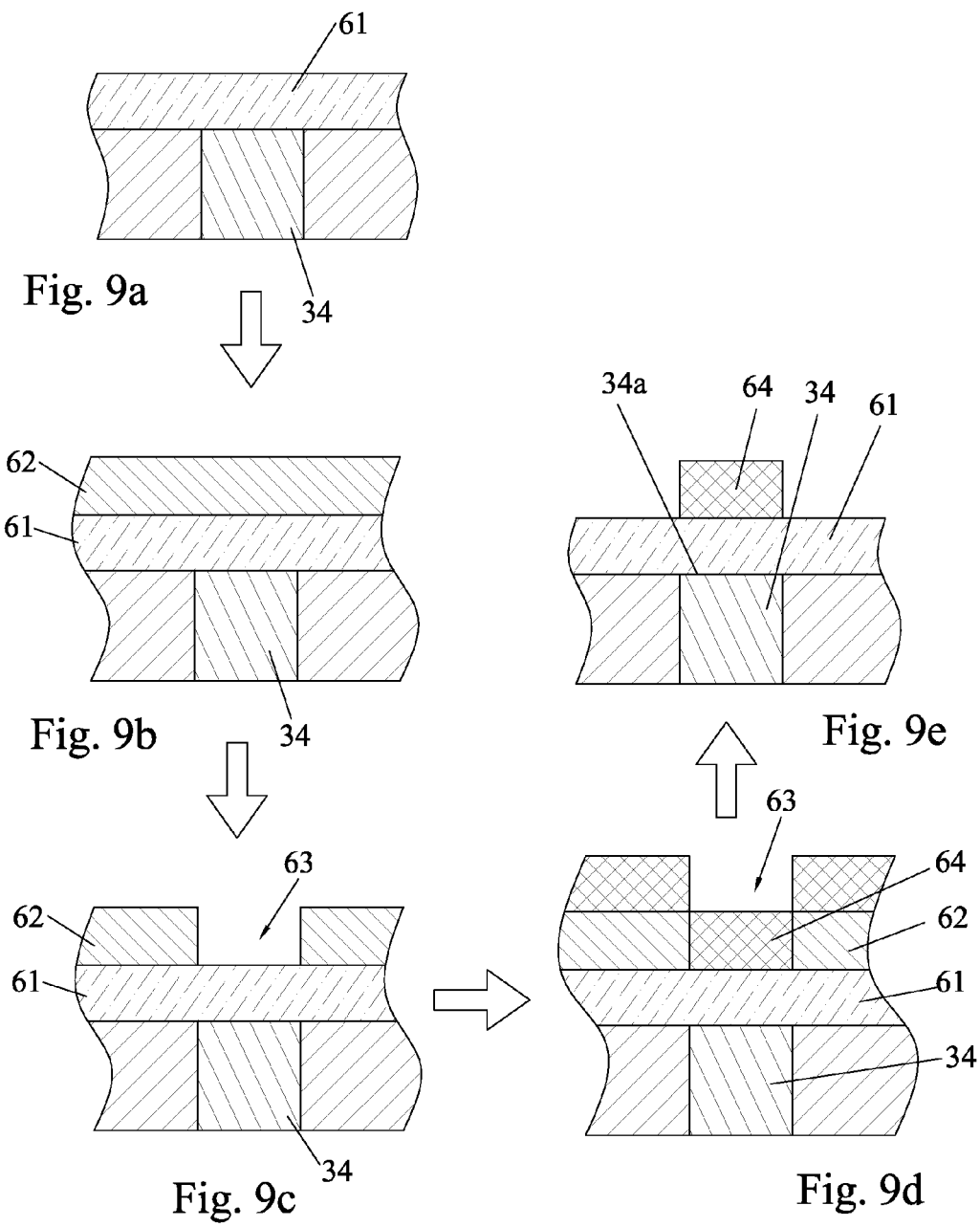

SURFACE FORMING METHOD FOR ELECTRONIC COMPONENT

FIELD OF THE INVENTION

The present invention relates to a surface forming method for electronic components and, more particularly, to a method for forming a recess/opening, or a layer/film on a surface for electronic components including waveguides to simplify the forming process thereof.

BACKGROUND OF THE INVENTION

Waveguides served as a device for transmitting electromagnetic wave in microwave or visible light wave band are commonly included in electronic components such as thermally assisted magnetic heads in information storage devices.

In performing the thermally assisted magnetic writing, near field light is generally used for applying heat to a magnetic recording medium. In this technology, light propagating through a waveguide (guided light) is not directly applied to a plasmon generator, but the guided light is coupled to the plasmon generator through evanescent coupling, and surface plasmon polaritons generated on a surface of the plasmon generator are utilized.

As the waveguide is functioned as guiding light, thus a temperature rise of the surface of the writing element is occurred, and heat will be congregated on the surface of the waveguide or its neighbors to damage the elements. For solving this problem, people tries to study to improve the surface performance, by changing and improving the material of the waveguide, or adding a film on the waveguide, etc.

A conventional surface forming method is to form a film 104 to cover the end surface of the small area on the main portion 103, as shown in FIG. 1a-1c. Commonly, the photoresist film 101 covered on the front end surface (which is to be formed as an air bearing surface 10) of the writing element 100 is partly exposed by UV light 12 emitted to the front end surface directly. Concretely, this position to be removed must be aligned to the end surface of the small area on the main portion 103. Due to the UV light 12 is emitted to the front end surface of the writing element 100, from top to bottom, thus it's necessary to align the light 12 with the right position of the end surface of the main portion 103, so as to prevent the main portion 103 of the writing element being exposed. As a result, such a UV exposure process must be performed accurately and patiently, which leads to a time-consuming process for a plurality of writing elements to be machined. All appearance, it's inefficient to use this surface forming method to production in batches.

Thus it is desired to provide a surface forming method for electronic component, to overcome the drawbacks mentioned above.

SUMMARY OF THE INVENTION

One objective of the present invention is to provide a surface forming method for electronic component, which forms surface patterns on an end surface of a waveguide in the electronic component by irradiating a light from a back surface of the electronic component, thereby the position and size of the pattern could be controlled accurately and efficiently, instead of inefficient complex procedures of alignment.

Another objective of the present invention is to provide a surface forming method for electronic component, which forms a layer/film on an end surface of a waveguide in the electronic component, thereby the position and size of the layer could be controlled accurately and efficiently, instead of inefficient complex procedures of alignment.

To achieve above objectives, a surface forming method for electronic component according to the present invention includes steps of:

(1) forming a body that has at least one waveguide, with two ends of the waveguide exposed on a front end surface and a back end surface of the body;

(2) forming a photoresist film to cover on the front end surface of the body;

(3) irradiating a light from the back end surface of the body to remove a part, of the photoresist film, that covers at least a part of an end surface of the waveguide, thereby forming an exposed area on the end surface of the waveguide;

(4) etching the exposed area of the waveguide to form a recess; and (5) removing the photoresist film.

As a preferable embodiment, it further includes forming a film to cover the recess thereby directly covering the end surface of the waveguide.

A surface forming method for electronic component accordingly to the present invention, includes steps of:

(1) forming a body that has at least one waveguide, with two ends of the waveguide exposed on a front end surface and a back end surface of the body;

(2) forming a photoresist film on the front end surface of the body;

(3) irradiating a light from the back end surface of the body to remove a part, of the photoresist film, that covers at least a part of an end surface of the waveguide, thereby forming an exposed area on the end surface of the waveguide;

(4) forming a film on the exposed area to cover the end surface of the waveguide; and (5) removing the photoresist film.

As a preferable embodiment, the method further includes forming a base layer to cover on the front end surface of the body.

As another preferable embodiment, the step (3) specifically includes step of:

irradiating the light from the back end surface of the body to remove a part, of the photoresist film, that covers at least a part of the end surface of the waveguide; and etching the base layer where covers at least a part of the end surface of the waveguide, thereby forming the exposed area on the end surface of the waveguide.

As one more preferable embodiment, the step (3) specifically includes step of:

irradiating the light from the back end surface of the body to remove the part of the photoresist film, thereby forming the expose area where the base layer is exposed.

Preferably, the light is UV light which has a wavelength that is lower than 500 nm.

Preferably, the step (3) is performed on multiple bodies with a plurality of waveguides.

Preferably, the method further includes putting the bodies on a quartz substrate, and irradiating a light to a side of the quartz substrate.

Preferably, the film is made by material which is one or more selected from TaOx, SiOx, AlOx, WOx, BCxNy, AlNx, SiNx, AlOxNy, SiOxNy, TiOx, ZrOx, MgOx, ZrOxNy, YOx, NbOx, GaNx, Au, Cu, Au alloy, Cu alloy, Ir, Fe, Mg, Ag, Pt, Pd, Ru, Al, Ni, Co, Cr, Ta, Ti, Ru, W, Mo, BN, SiC, AgNi, AgPd, AuNi, AuCu, AlNi, TiN, ZrN, and HfN.

Preferably, the base layer is made by material which is one or more selected from carbide, diamond-like carbon, TaOx, SiOx, AlOx, WOx, BCxNy, AlNx, SiNx, AlOxNy, SiOxNy, TiOx, ZrOx, MgOx, ZrOxNy, YOx, NbOx, GaNx, ErOx, and HfOx.

In comparison with the prior art, the present surface forming method irradiates a light from the back surface of the body to form an exposed area on the end surface of the waveguide, and then forms surface patterns (such as a recess) or layers (such as a film) corresponding to the position of the end surface of the waveguide, it's unnecessary to control the position of the patterns or layers because the light will be only transmitted through the waveguide to its front end surface, but not trough the rest portions of the body. In other words, there is no need to align the irradiating light with the position of patterns or layers in the present method, which simplifies the surface forming process and improves the manufacturing efficiency significantly.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 5b is a perspective view illustrating a process subsequent to that of FIG. 4a.

FIGS. 8a-8e are cross-sectional views showing a surface forming method of electronic component according to a third embodiment in the order of its forming process steps; and FIGS. 9a-9e are cross-sectional views showing a surface forming method of electronic component according to a fourth embodiment in the order of its forming process steps.

DETAILED DESCRIPTION OF ILLUSTRATED EMBODIMENTS

Figure 1A:
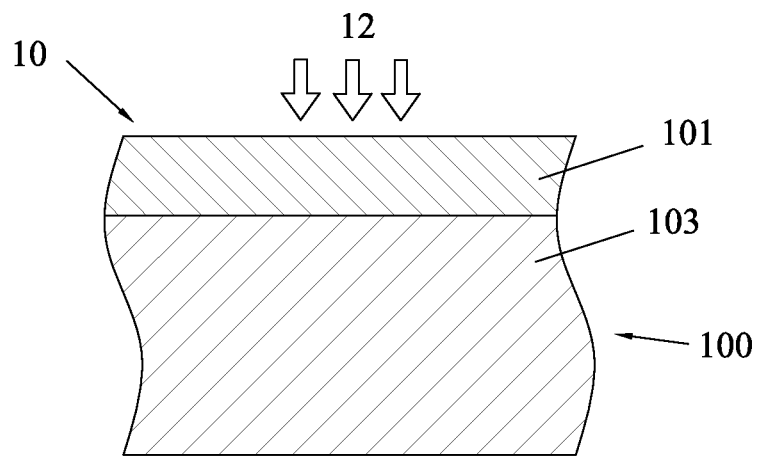
FIG. 1a-1c are cross-sectional views showing a conventional surface forming method of electronic component in the order of its forming process steps.
Figure 1B:
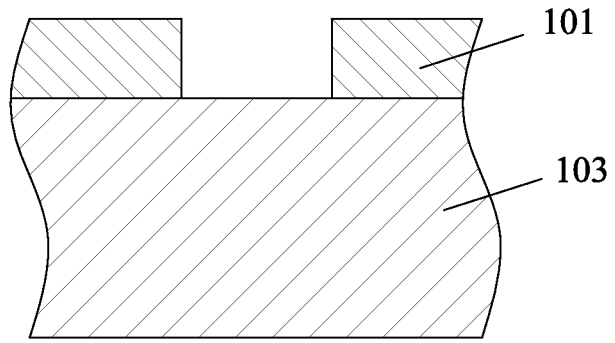
Figure 1C:
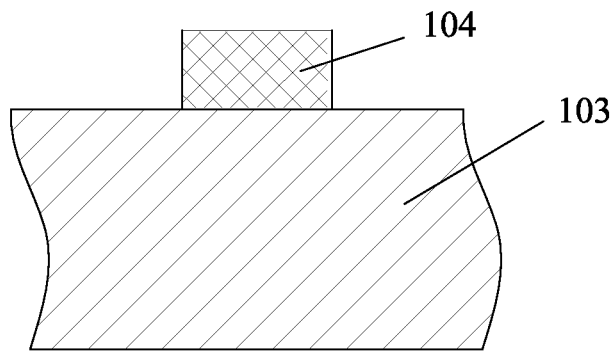

Various preferred embodiments of the invention will now be described with reference to the figures, wherein like reference numerals designate similar parts throughout the various views. As indicated above, the invention is directed to a surface forming method for electronic component, which forms surface patterns or layers on an end surface of a waveguide in the electronic component by irradiating a light from a back surface of the electronic component, thereby the position and size of the pattern could be controlled accurately, instead of a complex process.

Figure 2:
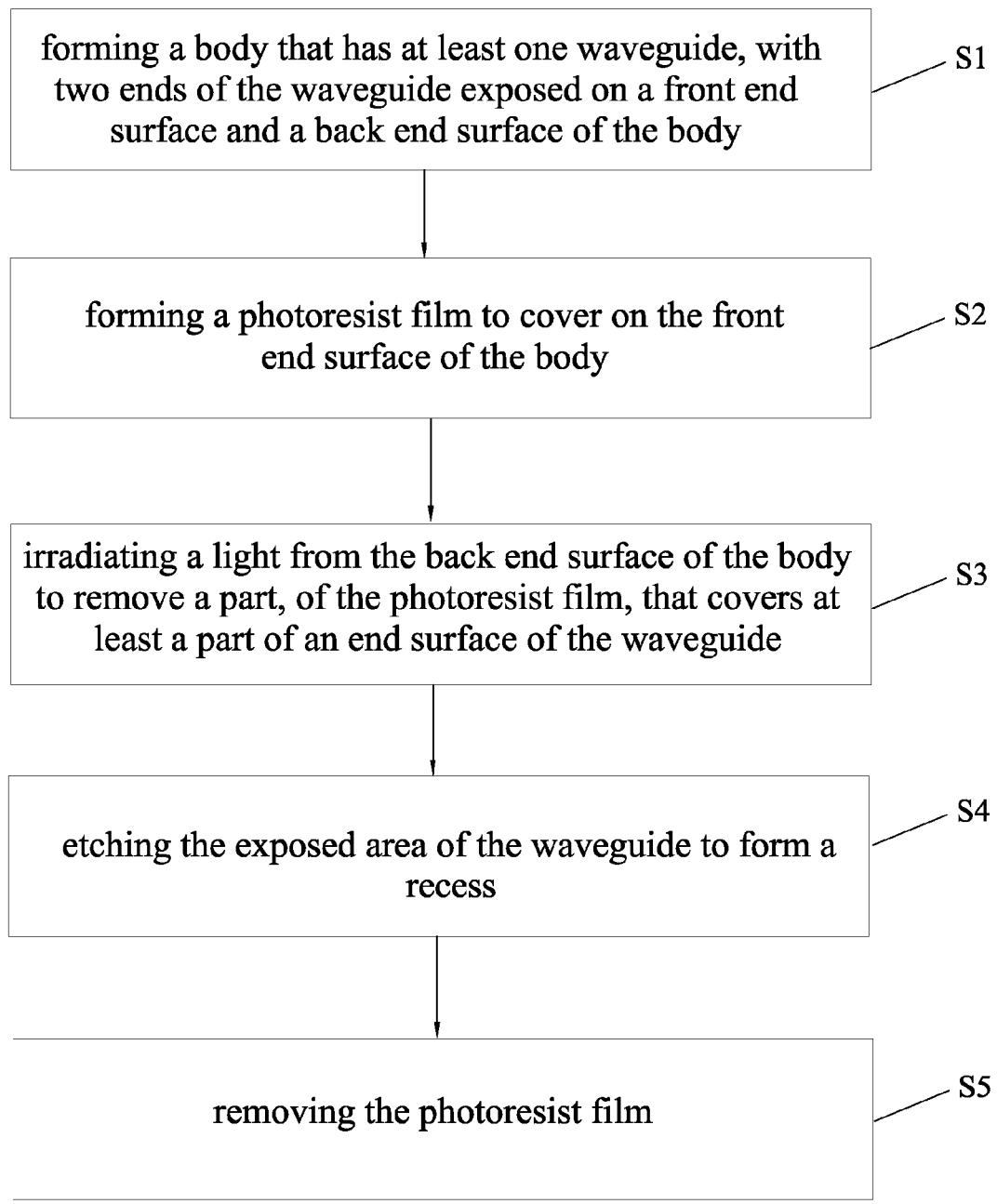
FIG. 2 is a simplified flowchart of a surface forming method of electronic component according to a first embodiment of the present invention.

FIG. 2 is a simplified flowchart of a surface forming method of electronic component according to a first embodiment of the present invention. Concretely, this method includes the following steps:

S1, forming a body that has at least one waveguide, with two ends of the waveguide exposed on a front end surface and a back end surface of the body;

S2, forming a photoresist film to cover on the front end surface of the body;

S3, irradiating a light from the back end surface of the body to remove a part, of the photoresist film, that covers at least a part of an end surface of the waveguide, thereby forming an exposed area on the end surface of the waveguide;

S4, etching the exposed area of the waveguide to form a recess; and

S5, removing the photoresist film.

This method will be described by combining FIGS. 3a-3e.

Figure 3A:
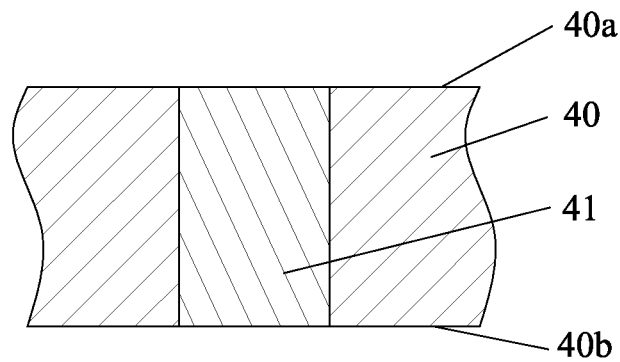
FIG. 3a-3e showing a surface forming method of electronic component according to the first embodiment in the order of its forming process steps.
Figure 3B:
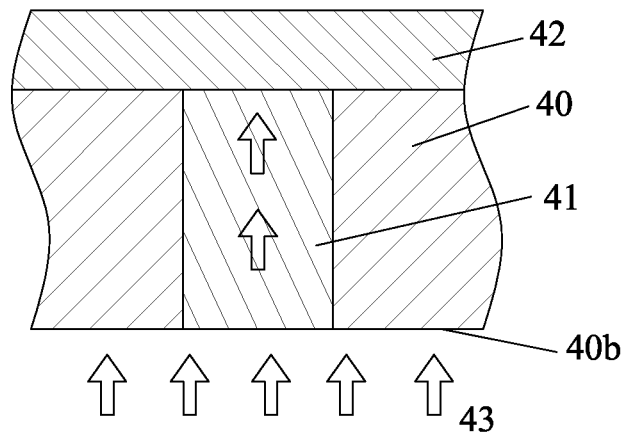
Figure 3C:
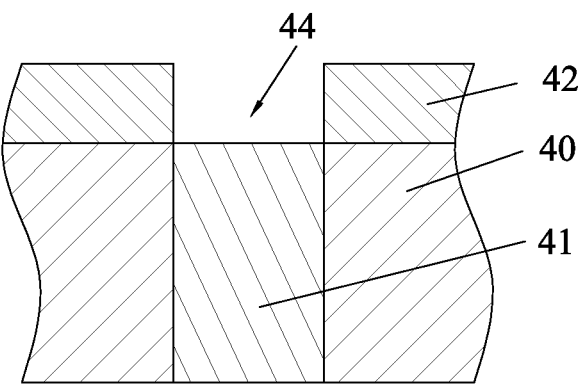
Figure 3D:
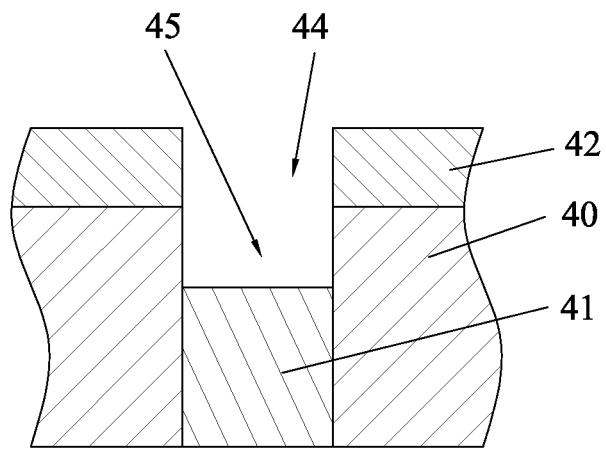
Figure 3E:
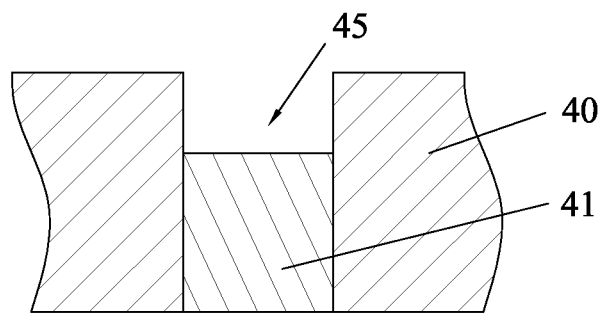

As shown in FIG. 3a, the electronic component has a body 40 which a waveguide 41 is included therein, and two ends of the waveguide 41 are exposed on a front end surface 40a and a back end surface 40b of the body 40. The front end surface 40a is to be machined so as to meet some requirements, for example, it will be patterned or added layers. In this embodiment, a recess on the front end surface of the waveguide 41 is to be formed. As shown in FIG. 3b, a photoresist film 42 is covered on the front end surface 40a of the body 40. For making the recess pattern, a UV light beam 43 is emitted to the back end surface 40b of the body 40 vertically, from bottom to top. Since the waveguide 41 is the only element that transmits and guide the light 43, thus the UV light beam 43 is transmitted through the waveguide 41 from bottom to top, to reach the photoresist film 42, so that, a part of the photoresist film 42 corresponding to the front end of the waveguide 41 is removed, and which the process is so-called UV exposure. As shown in FIG. 3c, an exposed area 44 on the front end surface of the waveguide 41 is formed accordingly. Subsequently, this exposed area 44 is etched by conventional etching method, with a predetermined etching size, to form a recess 45 that is communicated with the exposed area 44 as illustrated in FIG. 3d. Therefore, surface pattern is formed by removing the photoreist film 42, as shown in FIG. 3e.

In the present surface forming method, the light is irradiated from the back surface of the body 40 to form an exposed area 44 on the end surface of the waveguide 41, it's unnecessary to control the position of the patterns or layers because the light will be only transmitted through the waveguide 41 to its front end surface, but not trough the rest portions of the body 40. In other words, there is no need to align the irradiating light with the position of patterns or layers in the present method, which simplifies the surface forming process and improves the manufacturing efficiency significantly.

Figure 3F:
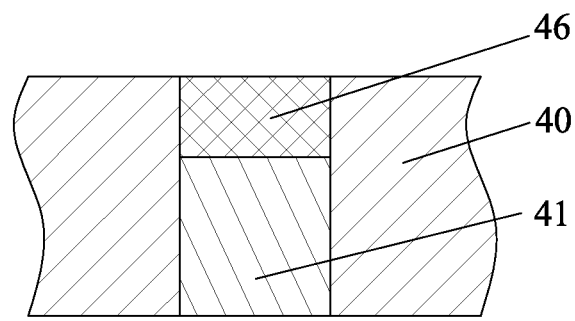
FIG. 3f shows another embodiment of a surface forming method with a film formed.

As a modified embodiment, the method may further include forming a film 46 to cover the recess 45 thereby directly covering the end surface of the waveguide 41, as shown in FIG. 3f. Concretely, this film 46 is coated on the recess 45 and the surface of the photoresist film 42 firstly before it's removed, after that, the photoresist film 42 is remove to obtain the film 46 on the recess 45.

It's understood for persons skilled in the art that, this surface forming method is applicable to any electronic component with waveguide included, such as magnetic heads of hard disk drives, or other devices. For explanation, infra, an example of a magnetic read/write head with a waveguide is described in detail, which is not limited however.

A magnetic head slider (not shown) includes a substrate, and a magnetic read write head including a read head and a write head embedded in the substrate for reading and writing. The substrate may be substantially formed as a hexahedron, for example, and one surface thereof corresponds to an ABS that is disposed in proximity to and to face the recording surface of the magnetic disk. When the disk is rotated at a high speed, the slider will move above the front surface of the magnetic disk to be in a load state. The high-speed rotation of the magnetic disk causes an air flow between the recording surface and the ABS, and the resulting lift force leads to a state where the slider floats to maintain a certain distance (magnetic spacing) in a direction orthogonal to the recording surface.

Figure 4:
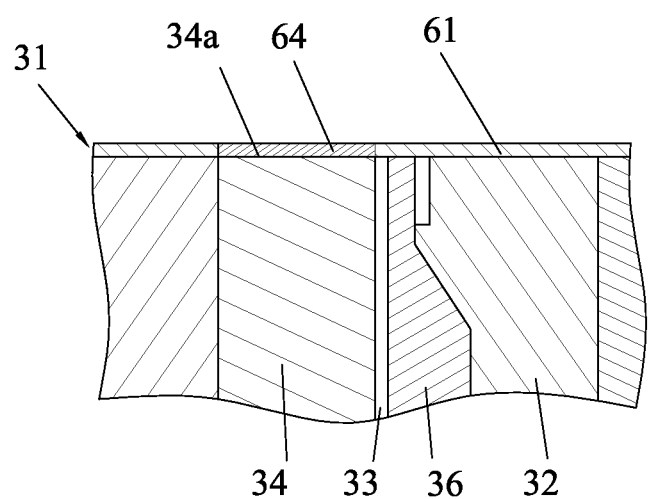
FIG. 4 is a cross-sectional view of a magnetic write head with a waveguide.

Specifically, as shown in FIG. 4, a magnetic write head 30 includes a magnetic pole 32 in which several coils (not shown) are sandwiched, a waveguide 34 formed adjacent to the magnetic pole 32 for guiding light generated at the light source module, and a plasmon generator 36 sandwiched between the magnetic pole 32 and the waveguide 34 for propagating near-field light to the ABS 31. And a gap 33 is formed between the waveguide 34 and the plasmon generator 36. The waveguide 34 has one end surface 34a exposed on the ABS 31 and the other end surface exposed at the backward thereof. The waveguide 34 is formed by a dielectric material that allows UV light to pass therethrough.

Combining FIG. 5a-5b, 6a-6f, the surface forming method of the magnetic write head 30 is described.

Figure 5A:
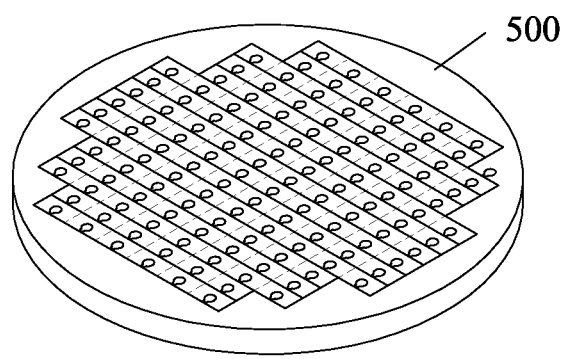
FIG. 5a is a perspective view illustrating a process in a surface forming method of electronic component according to a second embodiment of the present invention.

Specifically, first, as illustrated in FIG. 5a, a wafer 500 which may be made of, for example, AlTiC is prepared. The wafer 500 serves eventually as a plurality of sliders 300. Thereafter, a plurality of magnetic read write heads 310 are formed in an array on the wafer 500. The magnetic read write head 310 is manufactured mainly by forming and stacking a series of components by using an existing thin-film process. As the mainly processes are well known to persons ordinarily skilled in the art, thus its detailed description is omitted here.

Figure 5B:
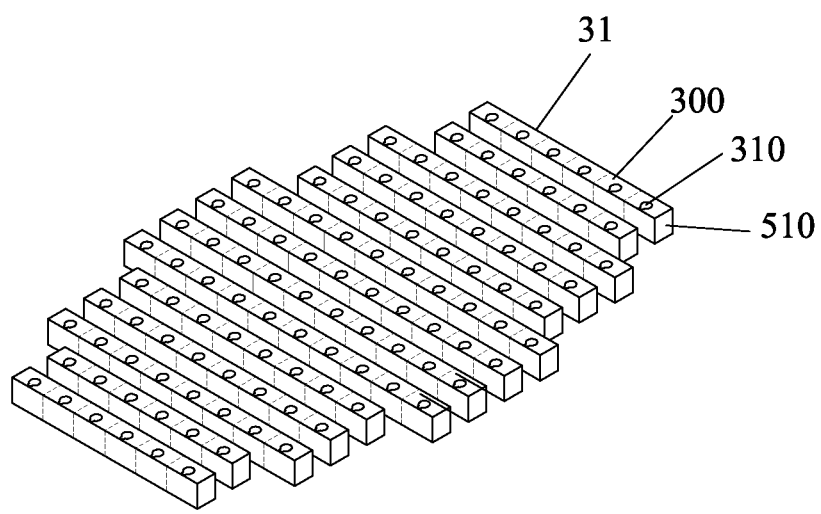

Thereafter, as illustrated in FIG. 5b, the wafer 500 is cut to form a plurality of row bars 510. The plurality of magnetic read write heads 310 are formed in line in each of the row bars 510.

Figure 6A:
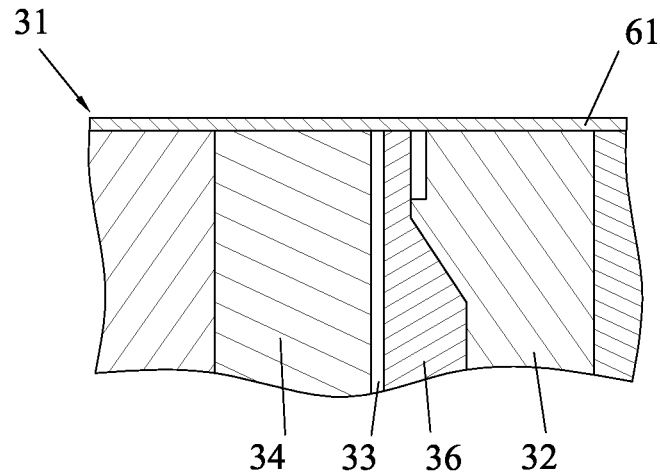
FIGS. 6a-6f are cross-sectional views illustrating processes subsequent to that of FIG. 5b.

After forming the ABS 31, a base layer 61 is so formed as to cover an entire part of the ABS 31 as illustrated in FIG. 6a. The base layer 61 may be formed using carbide, diamond-like carbon (DLC), TaOx, SiOx, AlOx, WOx, BCxNy, AlNx, SiNx, AlOxNy, SiOxNy, TiOx, ZrOx, MgOx, ZrOxNy, YOx, NbOx, GaNx, ErOx, or HfOx. Commonly, the DLC film 61 is formed by deposition process. Optionally, this base layer 61 may be a two-layer structure including a metal layer and a protection layer, which is not limited here.

Figure 6B:
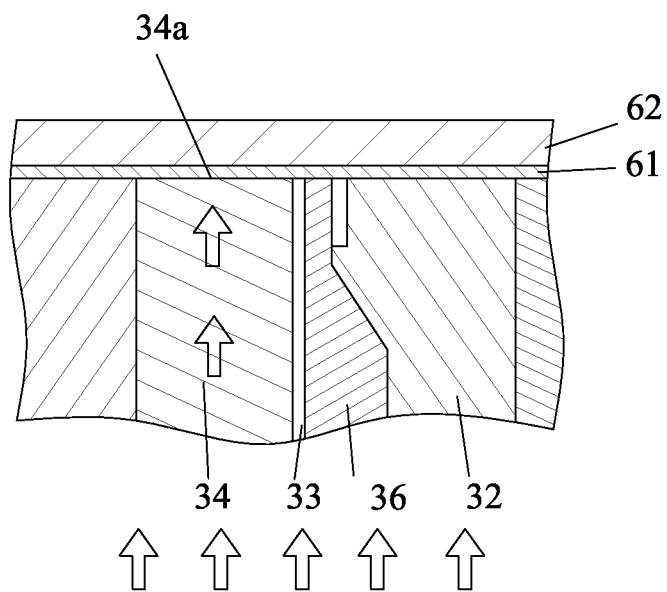
Figure 6C:
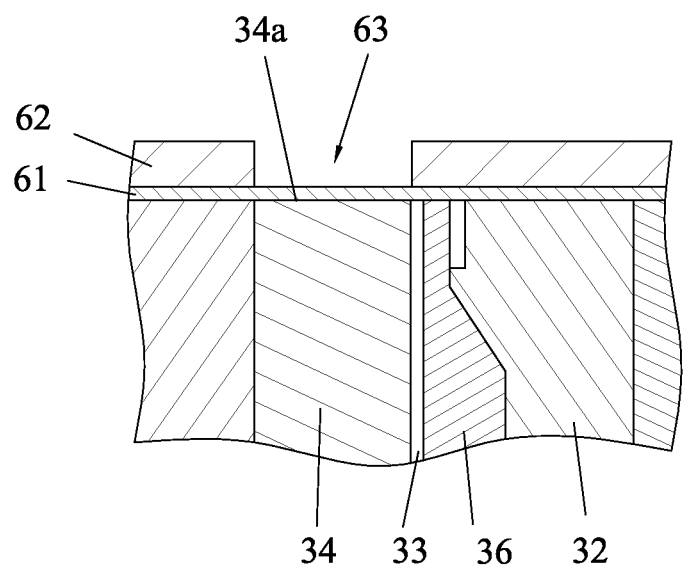
Figure 6D:
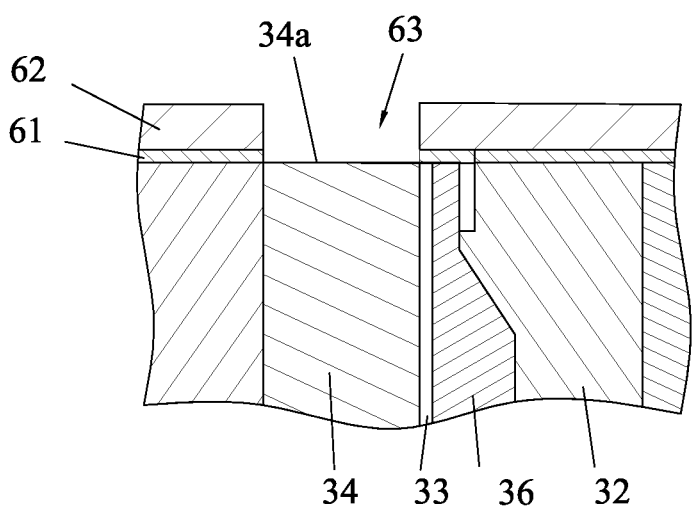

Next, a photoresist film 62 is coated on the base layer 61, and a part of the photoresist film 62 that covers the waveguide 34 is removed, to form an exposed area 63 corresponding to the part of the photoresist film 62 that covers the end surfaces 34a of the waveguide 34. As shown in FIGS. 6b and 6c, the exposed area 63 may be obtained by irradiating a UV light or laser from a back end surface of the magnetic write head 30. Concretely, wavelength of the UV light or laser is not limited, any suitable wavelength could be used only if the photoresist film 62 can be exposed to light. For example, the wavelength of the UV light or laser is lower than 500 nm. And then, a part of the base layer 61 where covers the end surface of the waveguide 34 is etched, so that, the exposed area 63 is extended to expose the end surface 34a of the waveguide 34, as shown in FIG. 6d.

Figure 6E:
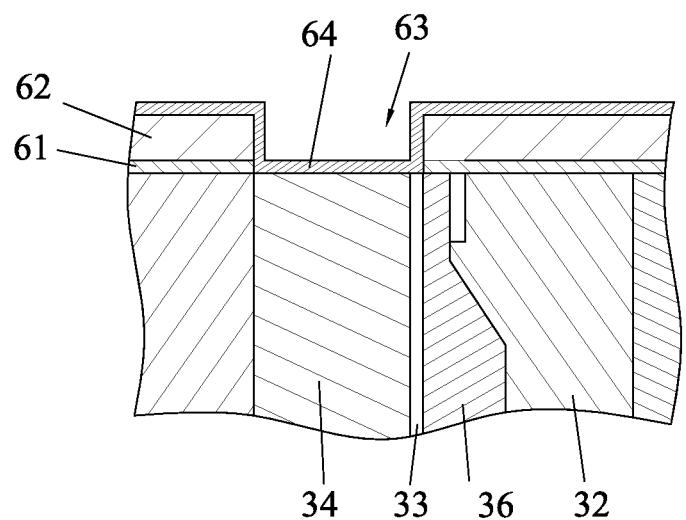
Figure 6F:
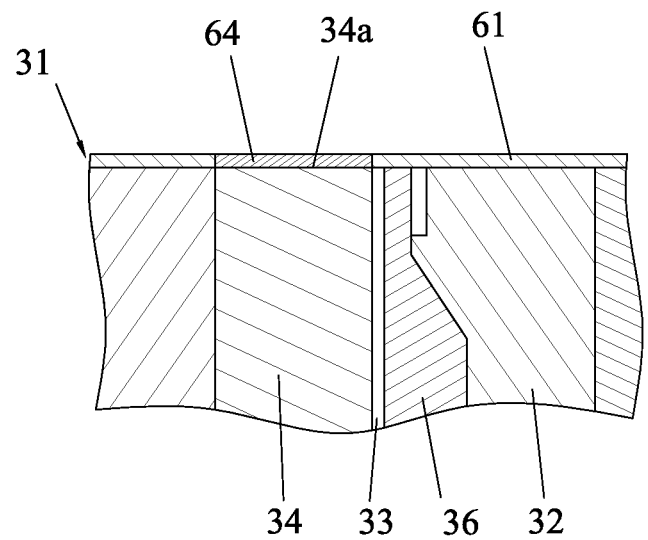

After etching, as shown in FIG. 6e, a film 64 is so formed as to fill the etching opening and to cover the end surfaces 34a of waveguide 34 and the surface of the photoresist film 62. And then, the photoresist film 62 is removed, so that, the film 64 is directly covered the end surfaces 34a of the waveguide 34, and the base layer 61 directly covered the end surfaces of the magnetic pole 32 and the other portions, as shown in FIG. 6f. In this embodiment, the top surfaces of the base layer 61 and the film 64 are at the same level, but they could has level difference in other embodiments.

Optionally, the film 64 is made by material which is one or more selected from TaOx, SiOx, AlOx, WOx, BCxNy, AlNx, SiNx, AlOxNy, SiOxNy, TiOx, ZrOx, MgOx, ZrOxNy, YOx, NbOx, GaNx, Au, Cu, Au alloy, Cu alloy, Ir, Fe, Mg, Ag, Pt, Pd, Ru, Al, Ni, Co, Cr, Ta, Ti, Ru, W, Mo, BN, SiC, AgNi, AgPd, AuNi, AuCu, AlNi, TiN, ZrN, and HfN. In addition, this film 64 may be a two-layer structure, or multi-layer structure, which is not limited here.

Finally, the row bar 510 will be cut into a plurality of individual thermally assisted magnetic head sliders 300; thereby the whole process is accomplished.

Figure 7:
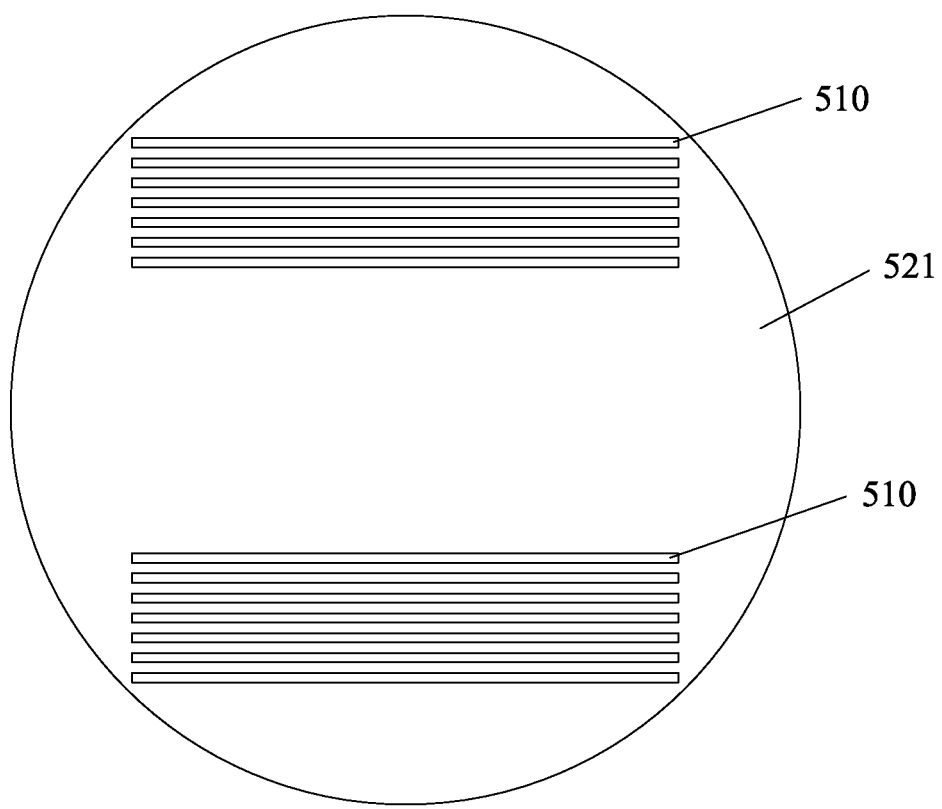
FIG. 7 is a top view illustrating several row bars being processed on a quartz substrate.

As a preferred embodiment, procedures as shown in FIGS. 6a-6f are performed on a quartz (glass) substrate 521. As shown in FIG. 7, the row bars 510 are put on a quartz substrate 521. Concretely, a transparent tape (not shown) is configured on the surface of the quartz substrate 521, to support the row bars 510. When forming the exposed area 63, the UV light or laser is emitted to a side of the quartz substrate 521 and then reached to the photoresist film 62.

Compared with the prior art, the light is irradiated from the back surfaces (opposite the ABS) of the row bars 510 to form exposed areas on the front end surface 34a of the waveguide 34, it's unnecessary to control the position of the exposed area 63 because the light will be only transmitted through the waveguide 34 to its front end surface 34a, but not trough the rest portions of row bars 510. Therefore, there is no need to align the irradiating light with the position of film 64 in the present method, which simplifies the surface forming process and improves the manufacturing efficiency significantly.

As an alternative embodiment, the base layer 61 may be omitted, but the film 64 is formed to cover the front end surface of the waveguide 34 directly, whose processing steps can be referred to FIGS. 8a to 8e, and the same process can be referred to the embodiments mentioned above.

As another embodiment, FIG. 9a-9e show a surface forming method of electronic component according to another embodiment in the order of its forming process steps. The different between the instant embodiment and the embodiment of FIG. 6a-6f is that, no etching process is made on the base layer 61, that is, the exposed area 63 is made to expose the base layer 61 but exclude the waveguide 34 as illustrated in FIG. 9c, and the film 64 is coated on the base layer directly corresponding to the front end surface 34a of the waveguide 34, as shown in FIG. 9e.

In conclusion, the present surface forming method irradiates a light from the back surface of the element body to form an exposed area on the end surface of the waveguide 34 or 41, and then forms surface recess or film corresponding to the position of the end surface of the waveguide 34 or 41, it's unnecessary to control the position of the patterns or layers because the light will be only transmitted through the waveguide to its front end surface, but not trough the rest portions of the element body. In other words, there is no need to align the irradiating light with the position of patterns or layers in the present method, which simplifies the surface forming process and improves the manufacturing efficiency significantly.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A surface forming method for electronic component, comprising:
   (1) forming a body that has at least one waveguide, with two ends of the waveguide exposed on a front end surface and a back end surface of the body, the back end surface of the body being opposite to the front end surface of the body;
   (2) forming a photoresist film to cover on the front end surface of the body;
   (3) irradiating a light from the back end surface of the body to remove a part, of the photoresist film, that covers at least a part of a front end surface of the waveguide, the light being transmitted only through the waveguide to the front end surface of the waveguide, thereby forming an exposed area on the end surface of the waveguide;
   (4) etching the exposed area of the waveguide to form a recess; and
   (5) removing the photoresist film.

2. The method according to claim 1, after step (4), further comprising:
   (4a) forming a film to cover the recess thereby directly covering the end surface of the waveguide.

3. A surface forming method for electronic component, comprising:
   (1) forming a body that has at least one waveguide, with two ends of the waveguide exposed on a front end surface and a back end surface of the body, the back end surface of the body being opposite to the front end surface of the body;
   (2) forming a photoresist film on the front end surface of the body;
   (3) irradiating a light from the back end surface of the body to remove a part, of the photoresist film, that covers at least a part of a front end surface of the waveguide, the light being transmitted only through the waveguide to the front end surface of the waveguide, thereby forming an exposed area on the end surface of the waveguide;
   (4) forming a film on the exposed area to cover the end surface of the waveguide; and
   (5) removing the photoresist film.

4. The method according to claim 3, wherein comprises:
   (2a) forming a base layer to cover on the front end surface of the body; and
   (2b) forming a photoresist film that is coated on the base layer.

5. The method according to claim 4, wherein comprises:
   irradiating the light from the back end surface of the body to remove a part, of the photoresist film, that covers at least a part of the front end surface of the waveguide; and etching the base layer which covers at least a part of the end surface of the waveguide, the light being transmitted only through the waveguide to the front end surface of the waveguide, thereby forming the exposed area on the end surface of the waveguide.

6. The method according to claim 4, wherein comprises:
   irradiating the light from the back end surface of the body to remove the part of the photoresist film, thereby forming the exposed area where the base layer is exposed.

7. The method according to claim 4, wherein the base layer is made by one or more materials selected from carbide, diamond-like carbon, TaOx, SiOx, AlOx, WOx, BCxNy, AlNx, SiNx, AlOxNy, SiOxNy, TiOx, ZrOx, MgOx, ZrOxNy, YOx, NbOx, GaNx, ErOx, and HfOx.

8. The method according to claim 3, wherein the light is a UV light which has a wavelength that is lower than 500 nm.

9. The method according to claim 3, wherein (3) is performed on multiple bodies with a plurality of waveguides.

10. The method according to claim 9, further comprising putting the bodies on a quartz substrate, and irradiating a light to a side of the quartz substrate.

11. The method according to claim 3, wherein the film is made by one or more materials selected from TaOx, SiOx, AlOx, WOx, BCxNy, AlNx, SiNx, AlOxNy, SiOxNy, TiOx, ZrOx, MgOx, ZrOxNy, YOx, NbOx, GaNx, Au, Cu, Au alloy, Cu alloy, Ir, Fe, Mg, Ag, Pt, Pd, Ru, Al, Ni, Co, Cr, Ta, Ti, Ru, W, Mo, BN, SiC, AgNi, AgPd, AuNi, AuCu, AlNi, TiN, ZrN, and HfN.

* * * * *